United States Patent
Baldys et al.

(10) Patent No.: US 10,794,408 B2
(45) Date of Patent: Oct. 6, 2020

(54) METHOD AND SYSTEM FOR GENERATING AN ALERT RELATING TO A HYDRAULIC ACTUATION SYSTEM

(71) Applicant: HYVA HOLDING B.V., Alphen aan den Rijn (NL)

(72) Inventors: Marek Baldys, Amsterdam (NL); Maarten Hertog, Utrecht (NL); Jacob Biemond, Bodegraven (NL)

(73) Assignee: Hyva Holding B.V., Alphen aan den Rijn (NL)

( * ) Notice: Subject to any disclaimer, the term of this patent is extended or adjusted under 35 U.S.C. 154(b) by 1086 days.

(21) Appl. No.: 15/061,521

(22) Filed: Mar. 4, 2016

(65) Prior Publication Data
US 2016/0258452 A1    Sep. 8, 2016

(30) Foreign Application Priority Data

Mar. 6, 2015 (GB) .................................. 1503875.5
Feb. 26, 2016 (GB) .................................. 1603355.7

(51) Int. Cl.
*F15B 19/00* (2006.01)
*B60P 1/16* (2006.01)
(Continued)

(52) U.S. Cl.
CPC .............. *F15B 19/00* (2013.01); *B60P 1/162* (2013.01); *F15B 19/005* (2013.01);
(Continued)

(58) Field of Classification Search
CPC ........... B60P 1/00; B60P 1/162; B60P 3/1033; F15B 19/00; F15B 19/005; F15B 21/041;
(Continued)

(56) References Cited

U.S. PATENT DOCUMENTS

| 2,661,696 A | * | 12/1953 | Elmer | ................... F16D 25/048 |
| | | | | 417/310 |
| 2010/0045093 A1 | * | 2/2010 | Foisie | ..................... B60P 1/045 |
| | | | | 298/17 S |

(Continued)

FOREIGN PATENT DOCUMENTS

| CN | 103899597 A | 7/2014 |
| DE | 29920780 U1 | 2/2000 |
| EP | 2778439 A2 | 9/2014 |

OTHER PUBLICATIONS

GB Search Report dated Aug. 27, 2015 for GB1503875.5.

*Primary Examiner* — Robert Clemente
*Assistant Examiner* — Akash K Varma
(74) *Attorney, Agent, or Firm* — Kristin L. Murphy; Honigman LLP

(57) ABSTRACT

There is disclosed a method of generating an alert relating to a hydraulic actuation system for actuating a hydraulic cylinder, the hydraulic control system comprising a hydraulic fluid tank and a hydraulic fluid filter. The method comprises monitoring the pressure drop over the hydraulic fluid filter; determining a rate of change characteristic relating to the rate of change of pressure drop over at least one time period in which there is a hydraulic fluid flow through the hydraulic fluid filter; determining whether the hydraulic fluid is dirty based on at least the rate of change characteristic; and generating an alert if it is determined that the hydraulic fluid is dirty.

20 Claims, 3 Drawing Sheets

(51) Int. Cl.
  *G01N 15/08* (2006.01)
  *F15B 21/041* (2019.01)
  *F15B 1/26* (2006.01)
(52) U.S. Cl.
  CPC ....... *F15B 21/041* (2013.01); *G01N 15/0826* (2013.01); *F15B 1/26* (2013.01); *F15B 2211/615* (2013.01); *F15B 2211/6306* (2013.01); *F15B 2211/6343* (2013.01); *F15B 2211/857* (2013.01); *F15B 2211/865* (2013.01); *F15B 2211/8636* (2013.01); *G01N 2015/084* (2013.01)
(58) Field of Classification Search
  CPC .................. F15B 1/26; F15B 2211/615; F15B 2211/6306; F15B 2211/6343; F15B 2211/857; F15B 2211/8636; F15B 2211/865; G01N 15/0826; G01N 2015/084
  USPC ........................................................ 210/741
  See application file for complete search history.

(56) References Cited

U.S. PATENT DOCUMENTS

| | | | |
|---|---|---|---|
| 2010/0187043 A1* | 7/2010 | Murahashi | F16H 57/0434 184/6.3 |
| 2015/0051798 A1* | 2/2015 | Cronholm | B60P 1/162 701/50 |
| 2015/0274057 A1* | 10/2015 | Hinde | B60P 1/162 298/22 R |
| 2015/0322975 A1* | 11/2015 | Kaufman | F15B 13/07 414/517 |
| 2015/0375662 A1* | 12/2015 | Wang | B60P 1/162 701/2 |

* cited by examiner

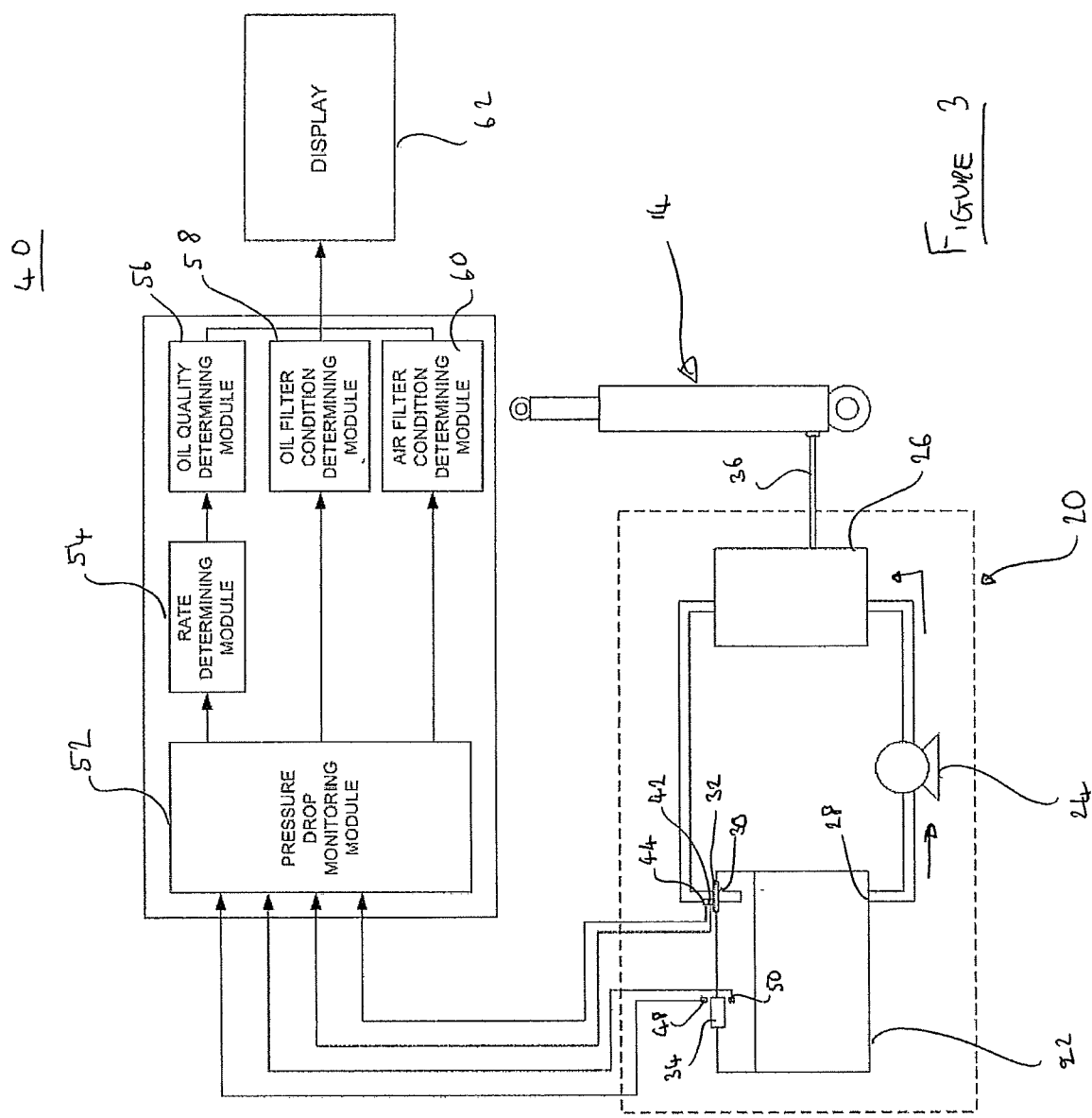

METHOD AND SYSTEM FOR GENERATING AN ALERT RELATING TO A HYDRAULIC ACTUATION SYSTEM

CROSS-REFERENCE TO RELATED APPLICATIONS

This application claims foreign priority benefits under 35 U.S.C. §119 to GB 1503875.5 filed on 6 Mar. 2015 and to GB 1603355.7 filed on 26 Feb. 2016, which are hereby incorporated by reference in their entirety for any and all purposes.

BACKGROUND

The invention relates to a method and system for generating an alert in a hydraulic actuation system. In particular, the invention relates to generating an alert if the hydraulic fluid needs changing, or if a filter is blinded.

A tipper truck, sometimes referred to as a dump or dumper truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types do exist.

Tipper trucks are usually provided with hydraulic actuation systems for actuating the hydraulic cylinder. Such hydraulic actuation systems typically comprise an oil tank, a pump and a valve assembly. The oil tank is provided with an oil filter which filters particulate matter out of the oil, and an air filter which filters particulate matter out of air drawn into the oil tank. Over time, the air filter may become blocked (or blinded) with particles such as sand, dust etc. Similarly, the oil filter may become blocked (or blinded) with particles such as sand, dust, or metal particles from other components of the hydraulic circuit (e.g. the pump or hydraulic cylinder). Also, the oil filter is not completely effective and therefore the amount of particulate matter in the oil increases over time making the oil dirty. Certain types of particles within the oil, for example metal particles, may be particularly damaging to the hydraulic actuation system. Further, once the filters are blocked the efficiency of the system may be compromised.

It is therefore important to regularly change the filters and the oil; although for various reasons this may not always be done.

SUMMARY

According to an aspect there is provided a method of generating an alert relating to a hydraulic actuation system for actuating a hydraulic cylinder, the hydraulic control system comprising a hydraulic fluid tank and a hydraulic fluid filter, the method comprising: monitoring the pressure drop over the hydraulic fluid filter; determining a rate of change characteristic relating to the rate of change of pressure drop over at least one time period in which there is a hydraulic fluid flow through the hydraulic fluid filter; determining whether the hydraulic fluid is dirty (or needs changing) based on at least the rate of change characteristic; and generating an alert if it is determined that the hydraulic fluid is dirty (or needs changing). The method may allow it to be automatically determined that it necessary to change the oil as it is contaminated. The contaminants may include particulate matter such as sand and/or grit or metal particles, for example. This may prevent the hydraulic cylinder and other components of the hydraulic actuation system from becoming damaged.

The pressure drop may be monitored using at least an upstream pressure sensor which measures the pressure upstream of the hydraulic fluid filter. The pressure drop may be monitored using at least a downstream pressure sensor which measures the pressure downstream of the hydraulic fluid filter. The upstream pressure sensor and the downstream pressure sensor may be located either side of the hydraulic fluid filter. The or each pressure sensor could be an electronic pressure arranged to generate an electronic pressure signal, the value of which is related to the pressure. A single pressure sensor appropriately calibrated (e.g. with respect to atmospheric pressure or a standard pressure) may be used to monitor a pressure drop, or two pressure sensors may be used.

The method may further comprise generating a pressure drop parameter relating to the monitored pressure drop, and wherein the rate of change characteristic relates to the rate of change of the pressure drop parameter. If there are two pressure sensors, the pressure drop parameter may relate to the difference between the signals generated by the upstream pressure sensor and the downstream pressure sensor.

The method may further comprise: monitoring the temperature of the hydraulic fluid, and wherein the rate of change characteristic is determined based on at least the monitored pressure drop and the monitored temperature. The viscosity of the hydraulic fluid is affected by the temperature, and the pressure drop is affected by the viscosity. Thus, the temperature of the hydraulic fluid may be used to standardised or normalise all readings.

The method may further comprise: monitoring the temperature of the hydraulic fluid; generating a pressure drop parameter relating to the monitored pressure drop; normalizing the pressure drop parameter based on the temperature of the hydraulic fluid; and determining the rate of change characteristic based on the rate of change of the normalized pressure drop parameter.

The method may further comprise determining whether there is a hydraulic fluid flow through the hydraulic fluid filter. This may be done by analysing a pressure signal (e.g. the pressure drop) or by using a flow rate sensor. The pressure drop may only be analysed, monitored or recorded when it is determined that there is a hydraulic fluid flow through the hydraulic fluid filter.

The rate of change characteristic may be determined over a single time period (i.e. during a single fluid flow cycle) in which there is hydraulic fluid flow through the hydraulic fluid filter. The single time period may be one continuous operation time period. The rate of change characteristic may be determined over a plurality of time periods (i.e. a plurality of fluid flow cycles) in which there is hydraulic fluid flow through the hydraulic fluid filter. The rate of change characteristic may comprise a rate of change parameter.

Determining whether the hydraulic fluid is dirty may comprise comparing the rate of change characteristic with reference data. The comparison may be a direct comparison or an indirect comparison. For example, the characteristic could be converted into another form before comparison. It may be determined that the hydraulic fluid is dirty when the rate of change characteristic reaches a threshold. Generating an alert may comprise generating a visual and/or an audible alert.

According to another aspect there is provided a system for generating an alert relating to a hydraulic actuation system for actuating a hydraulic cylinder, the hydraulic control system comprising a hydraulic fluid tank and a hydraulic fluid filter, the system comprising: a pressure drop monitoring module arranged to monitor the pressure drop over the hydraulic fluid filter; a rate of change determining module arranged to determine a rate of change characteristic relating to the rate of change of pressure drop over at least one time period in which there is a hydraulic fluid flow through the hydraulic fluid filter; a hydraulic fluid quality determining module arranged to determine whether the hydraulic fluid is dirty based on at least the rate of change characteristic; and an alert generator arranged to generate an alert if it is determined that the hydraulic fluid is dirty.

The system may further comprise an upstream pressure sensor arranged to measure the pressure upstream of the hydraulic fluid filter. The system may further comprise a downstream pressure sensor arranged to measure the pressure downstream of the hydraulic fluid filter. The pressure drop monitoring module may be arranged to generate a pressure drop parameter relating to the monitored pressure drop. The rate of change determining module may be arranged to determine the rate of change characteristic based on to the rate of change of the pressure drop parameter.

The system may further comprise a temperature monitoring module arranged to monitor the temperature of the hydraulic fluid. The rate of change determining module may be arranged to determine the rate of change characteristic based on at least the monitored pressure drop and the monitored temperature.

The system may further comprise: a temperature monitoring module arranged to monitor the temperature of the hydraulic fluid; wherein the pressure drop monitoring module is arranged to generate a pressure drop parameter relating to the monitored pressure drop and is arranged to normalize the pressure drop parameter based on the temperature of the hydraulic fluid; and wherein the rate of change determining module is arranged to determine the rate of change characteristic based on the rate of change of the normalized pressure drop parameter. The system according may further comprise a temperature sensor arranged to measure the temperature of the hydraulic fluid.

The system may further comprise a hydraulic fluid flow determining module arranged to determine whether there is a hydraulic fluid flow through the hydraulic fluid filter. The pressure drop monitoring module may be arranged to analyse the pressure drop only when it is determined that there is a hydraulic fluid flow through the hydraulic fluid filter.

The rate of change determining module may be arranged to determine the rate of change characteristic over a single time period in which there is hydraulic fluid flow through the hydraulic fluid filter. The rate of change determining module may be arranged to determine the rate of change characteristic over a plurality of time periods in which there is hydraulic fluid flow through the hydraulic fluid filter. The rate of change characteristic may comprise a rate of change parameter.

The system may further comprise a storage module storing reference data. The hydraulic fluid quality determining module may be arranged to determine whether the hydraulic fluid is dirty by comparing the rate of change characteristic with reference data stored in the storage module. The hydraulic fluid quality determining module may be arranged to determine that the hydraulic fluid is dirty when the rate of change characteristic reaches a threshold.

The alert generator may comprise a visual and/or an audible alert generator.

According to a further aspect there is provided a method of generating an alert relating to a hydraulic actuation system for actuating a hydraulic cylinder, the hydraulic control system comprising a hydraulic fluid tank and at least one filter, the method comprising: monitoring the pressure drop over at least one filter; determining a pressure drop parameter relating to the pressure drop over at least one filter whilst there is a fluid flow through the filter; determining whether the at least one filter is blinded based on at least the pressure drop parameter; and generating an alert if it is determined that the at least one filter is blinded.

The pressure drop may be monitored using at least an upstream pressure sensor which measures the pressure upstream of the filter. The pressure drop may be monitored using at least a downstream pressure sensor which measures the pressure downstream of the filter. The upstream pressure sensor and the downstream pressure sensor may be located either side of the filter. The pressure drop parameter may relate to the difference between the signals generated by the upstream pressure sensor and the downstream pressure sensor. The or each pressure sensor could be an electronic pressure arranged to generate an electronic pressure signal, the value of which is related to the pressure. A single pressure sensor appropriately calibrated (e.g. with respect to atmospheric pressure or a standard pressure) may be used to monitor a pressure drop, or two pressure sensors may be used.

The method may further comprise determining whether there is a fluid flow through the at least one filter. This may be done by analysing a pressure signal (e.g. the pressure drop) or by using a flow rate sensor. The pressure drop may only be analysed, monitored or recorded when it is determined that there is a fluid flow through the at least one filter.

Determining whether the at least one filter is blinded may comprise comparing the pressure drop parameter with reference data. The comparison may be a direct comparison or an indirect comparison. For example, the pressure drop could be converted into another form before comparison. It may be determined that the at least one filter is blinded when the pressure drop parameter reaches a threshold. Generating an alert may comprise generating a visual and/or an audible alert.

The pressure drop over an air filter may be monitored, and an alert may be generated if it is determined that the air filter is blinded. The pressure drop over a hydraulic fluid filter may be monitored, and an alert may be generated if it is determined that the hydraulic fluid filter is blinded.

The method may further comprise monitoring the temperature of the hydraulic fluid, and wherein the pressure drop parameter is determined based on at least the monitored pressure drop and the monitored temperature. The pressure drop parameter may be a normalized pressure drop parameter based on the temperature of the hydraulic fluid. The viscosity of the hydraulic fluid is affected by the temperature, and the pressure drop is affected by the viscosity. Thus, the temperature of the hydraulic fluid may be used to standardised or normalise all readings.

According to yet a further aspect there is provided a system for generating an alert relating to a hydraulic actuation system for actuating a hydraulic cylinder, the hydraulic control system comprising a hydraulic fluid tank and at least one filter, the system comprising: a pressure drop monitoring module arranged to monitor the pressure drop over at least one filter and arranged to determine a pressure drop parameter relating to the pressure drop over at least one filter whilst there is a fluid flow through the filter; a filter condition determining module arranged to determine whether the at least one filter is blinded based on at least the pressure drop parameter; and an alert generator arranged to generate an alert if it is determined that the at least one filter is blinded.

The system may further comprise an upstream pressure sensor arranged to measure the pressure downstream of the filter. The system may further comprise a downstream pressure sensor arranged to measure the pressure downstream of the filter. The pressure drop parameter may relate to the difference between the signals generated by the upstream pressure sensor and the downstream pressure sensor.

The system may further comprise a flow determining module arranged to determine whether there is a fluid flow through the at least one filter. The pressure drop monitoring module may be arranged to analyse the pressure drop only when it is determined that there is a fluid flow through the at least one filter.

The system may further comprise a storage module storing reference data. The filter condition determining module may be arranged to determine whether the at least one filter is blinded by comparing the pressure drop parameter with reference data stored in the storage module. The filter condition monitoring module may be arranged to determine that the at least one filter is blinded when the pressure drop parameter reaches a threshold. The alert generator may comprise a visual and/or an audible alert generator.

The pressure drop monitoring module may be arranged to monitor the pressure drop over an air filter. The alert generator may be arranged to generate an alert if it is determined that the air filter is blinded. The pressure drop monitoring module may be arranged to monitor the pressure drop over a hydraulic fluid filter. The alert generator may be arranged to generate an alert if it is determined that the hydraulic fluid filter is blinded.

The system may further comprise: a temperature monitoring module arranged to monitoring the temperature of the hydraulic fluid. The pressure drop monitoring module may be arranged to determine the pressure drop parameter based on at least the monitored pressure drop and the monitored temperature. The pressure drop parameter may be a normalized pressure drop parameter based on the temperature of the hydraulic fluid.

According yet another aspect there is provided a hydraulic actuation system for actuating a hydraulic cylinder, comprising: a hydraulic fluid tank; a hydraulic fluid filter and/or an air filter; and a system in accordance with any statement herein. The hydraulic fluid filter and/or the air filter may be provided in a wall of tank.

According to yet another aspect there is provided a tipper comprising: a tipper body pivotably moveable with respect to a frame; a hydraulic cylinder disposed between the frame and the tipper body and actuatable to pivot the tipper body; and a hydraulic actuation system in accordance with any statement herein. The tipper may be a tipper vehicle.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the accompanying drawings, in which:

FIG. 3 schematically shows a hydraulic actuation system provided with a monitoring system.

DETAILED DESCRIPTION

Figure 1:
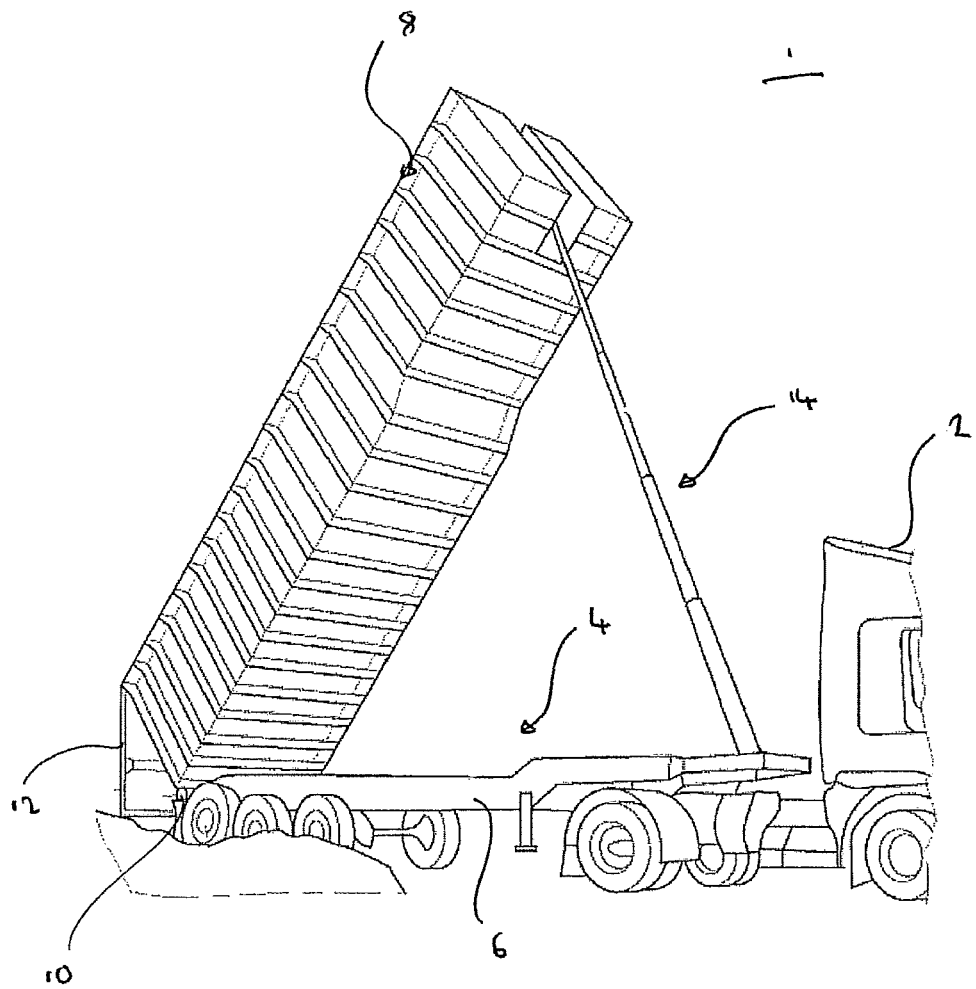
FIG. 1 schematically shows a perspective view of a tipper truck.
Figure 2:
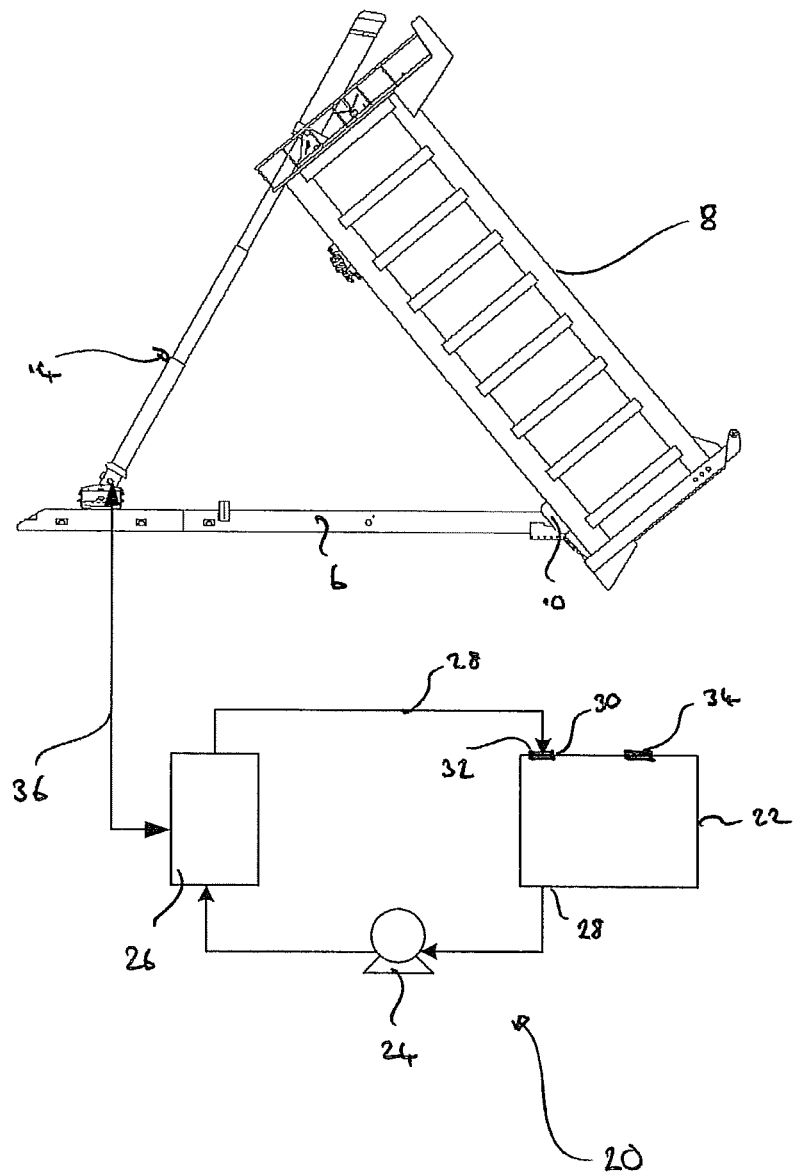
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A hydraulic cylinder 14 is provided that is pivotably attached at a lower end to the front of the chassis 6 and pivotably attached an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The tipper body 8 can be lowered back to the resting position under its own weight, thereby causing the cylinder 14 to retract.

The tipper truck 1 further comprises a hydraulic actuation system 20 for actuating the hydraulic cylinder 14. The hydraulic actuation system 20 comprises an oil tank (hydraulic fluid tank) 22, a pump 24 and a valve assembly 26 that are connected with fluid lines to form a fluid circuit. The oil tank 22 comprises an outlet 28 towards the bottom of the tank that is connected to the pump inlet with a fluid line. The oil tank 22 also comprises an inlet 30 towards the top of the tank that is connected to an outlet of the valve assembly 26 with a fluid line. A fluid line also connects the outlet of the pump 24 to an inlet of the valve assembly 26. The oil tank 22 comprises an oil filter (hydraulic fluid filter) 32 disposed in the inlet 30 to filter the oil entering the tank. The oil tank 22 also comprises an air port (open to atmospheric pressure) provided with an air filter 34 that filters air entering the oil tank 22.

The valve assembly 26 is provided with a port that is hydraulically connected to the hydraulic cylinder 14 with a fluid line 36. A pilot system (not shown) is also provided for switching the valve assembly between various configurations. The valve assembly 26 can be switched between a number of configurations in order to operate the hydraulic cylinder 14. In a bypass configuration of the valve assembly 26, with the pump 24 running, oil (hydraulic fluid) is circulated by the pump 24 from the tank 22, through the valve assembly 26 back to the tank 22. As the oil is returned to the oil tank 22 is passes through the oil filter 32 which filters out particulate matter in the oil. The particulate matter may be sand or girt, or more damagingly it may be metal particulates from the hydraulic cylinder or other metal components. With the valve assembly 26 in the bypass configuration the oil level within the tank remains substantially constant. This means that little, if any, air enters into or exits the through the air port.

In order to extend the hydraulic cylinder 14 to pivot the tipper body 8 to a fully tipped position (as in FIGS. 1 and 2), the valve assembly 26 is switched to a raising configuration in which the pump 24 pumps oil from the tank 22 into the hydraulic cylinder 14, thus causing it to extend. Thus, when the cylinder 14 is being extended, oil is no longer returned to the oil tank 22 (i.e. there is no fluid flow through the oil filter 32) as the pump 24 pumps oil into the cylinder 14. This cause the oil level within the oil tank 22 to drop, drawing air into the oil tank 22 through the air port. The air passes through the air filter 34 which filters out particulate matter in the air.

When the hydraulic cylinder 14 has been sufficiently extended (either fully extended or extended by the desired amount), the valve assembly 26 is returned to a bypass configuration in which, with the pump 24 running, oil is circulated from the tank 22 through the valve assembly 26 back to the tank 22. Once again, the oil entering the tank is filtered by the oil filter 32. In the bypass configuration of the valve assembly 26 the fluid line 28 is closed and therefore the cylinder 14 remains in the extended configuration.

In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the oil being returned to the tank 22 and passing through the filter 32. This causes the oil level within the tank 22 to rise, which causes air to exit the tank 22 through the air filter 34.

Each time the hydraulic cylinder 14 is extended air is drawn into the oil tank 22 through the air port. Although the air filter 34 filters out the majority of any particulate matter within the air, some particulate matter is drawn into the tank 22 and therefore enters the oil. The majority of the particulate matter in the oil is filtered out by the oil filter 30, but again some particulate matter does remain in the oil. Over a period of time the oil filter 32 and the air filter 34 become clogged (or blinded) with particulate matter. Further, the amount of particulate matter within the oil also increases over time making the oil dirty. In order to maintain an efficient and reliable hydraulic actuation system 20 it is necessary to periodically replace the filters 32, 34 and change the oil. As will be described in detail below, the hydraulic actuation system 20 is provided with a monitoring system 40 for monitoring the hydraulic actuation system 20 and capable of generating alerts indicating that the oil filter 32 should be replaced, the air filter 34 should be replaced, or the oil should be changed.

FIG. 3 shows the monitoring system 40 for monitoring the hydraulic actuation system 20. The monitoring system 40 comprises an upstream oil pressure sensor 42, an oil temperature sensor 44, an upstream air pressure sensor 48 and a downstream air pressure sensor 50. The upstream oil pressure sensor 42 is positioned upstream of the oil filter 32 and is arranged to measure the oil pressure upstream of the oil filter 32. The oil temperature sensor 44 is positioned within the oil flow upstream of the oil filter 32 and is arranged to measure the oil temperature. The output from the upstream pressure sensor 42 can be calibrated such that it can be used to measure or monitor the pressure drop over the oil filter. The upstream air pressure sensor 48 is outside of the oil tank 22 and is arranged to measure the ambient air pressure. The downstream air pressure sensor 50 is positioned within the oil tank 22 and is arranged to measure the air pressure within the oil tank 22. Thus, the two air pressure sensors 48, 50 can be used to measure the pressure drop over the air filter 34. The pressure sensors 42, 48, 50 are electronic pressure sensors arranged to generate electronic signals representative of the pressure measured. The temperature sensor 44 is also arranged to generate an electronic signal representative of the oil temperature measured.

The monitoring system 40 further comprises a pressure drop monitoring module 52, a rate determining module 54, an oil quality determining module 56, an oil filter condition determining module 58, an air filter condition determining module 60 and a display 62. The pressure sensors 42, 48, 50 and the temperature sensor 44 are all connected to the pressure drop monitoring module 52 by appropriate cabling such that the module 52 can obtain the electronic signals generated by the sensors. It should be appreciated that in other embodiments the sensors 42, 44, 48, 50 could be wirelessly connected to the module 52. As described below, the pressure drop monitoring module 52 is arranged to perform various functions.

The pressure drop monitoring module 52 is configured to monitor the signal received from the oil pressure sensor 42 to determine when there is fluid flow through the oil filter 32 (i.e. if it detects an increase in pressure it determines that there is fluid flow through the filter 32). The pressure drop monitoring module 52 is also configured such that when there is a fluid flow through the oil filter 32, it analyses the pressure drop over the oil filter 32 by monitoring the signal received from the oil pressure sensor 42 and determines an oil pressure drop parameter $\Delta P_O$. Since the viscosity of the oil changes with the temperature of the oil, the pressure drop monitoring module 52 is also arranged to monitor the signal received from the temperature sensor 44 and correct (or normalise) the oil pressure drop parameter $\Delta P_O$ based on temperature (i.e. the corrected pressure drop parameter $\Delta P_O$ is independent of the oil temperature and therefore viscosity). The pressure drop monitoring module 52 is also configured to monitor the signals received from the air pressure sensors 48, 50 to determine when there is air flow through the air filter 34 (i.e. if it detects an increase in pressure drop then it determines that there is air flowing through the air filter 34). The pressure drop monitoring module 52 is also configured such that when there is a fluid flow through the air filter 34, it analyses the pressure drop over the air filter 34 by monitoring the signal received from the pressure sensor 48 and determines an air pressure drop parameter $\Delta P_A$.

The rate determining module 54 is connected to the pressure drop monitoring module 52 and is configured to calculate the rate of change of the oil pressure drop parameter $\Delta P_O$. The rate of change may be calculated during one operational cycle (i.e. during a single continuous time period), or over a number of operational cycles (e.g. the average pressure drop parameter may be determined for each operational cycle and these may be used to generate a rate of change of $\Delta P_O$). The oil quality determining module 56 is configured to receive the rate of change of the oil pressure drop parameter $\Delta P_O$ and is configured to determine whether the oil is dirty (i.e. it contains too much particulate matter) based on the rate of change. This determination is made by comparing the rate of change received with pre-stored data stored within the module 56.

The oil filter condition determining module 58 is configured to receive the oil pressure drop parameter $\Delta P_O$ and is configured to determine whether the oil filter 32 is blinded (i.e. clogged/blocked with particulate matter) based on the pressure drop parameter $\Delta P_O$. This determination is made by comparing the pressure drop parameter $\Delta P_O$ received with pre-stored data stored within the module 58. The air filter condition determining module 60 is configured to receive the air pressure drop parameter $\Delta P_A$ and is configured to determine whether the air filter 34 is blinded (i.e. clogged/blocked with particulate matter) based on the pressure drop parameter $\Delta P_A$. This determination is made by comparing the pressure drop parameter $\Delta P_A$ received with pre-stored data stored within the module 60.

The display 62 is connected to the oil quality determining module 56, the oil filter condition determining module 58 and the air filter condition determining module 60. The display 62 is configured to generate an alert if the oil quality determining module 56 determines that the oil is dirty, an alert if the oil filter condition determining module 58 determines that the oil filter 32 is blinded, and an alert if the air filter condition determining module 60 detects that the air filter 34 is blinded. In this embodiment the display 62 is installed in the dashboard of the tractor 2 such that it is easily visible by an operator. However, in other embodiments it could be located externally, or it could be in the form of a wireless hand-held device (e.g. a smartphone or a tablet). If the display 62 is provided by a portable wireless device, such as a smartphone or tablet, it could also incorporate any or all of the modules 52, 54, 56, 58, 60 and could communicate wirelessly with the sensors 42, 44, 48, 50.

The operation of the hydraulic actuation system 20 will now be described.

In use, when the valve assembly 26 is in the bypass configuration oil flows through the oil filter 32 which filters particulate matter out of the oil. The upstream oil pressure sensor 42 generates an electronic signal representative of the oil pressure upstream of the filter 32 and this is received by the pressure drop monitoring module 52. Since there is flow through the oil filter 32, the oil pressure upstream of the oil filter 32 rises and therefore the pressure drop monitoring module 52 determines that there is oil flow through the oil filter 32. In response to this determination, the electronic pressure signal generated by the pressure sensor 42 is analysed. The pressure drop monitoring module 52 is calibrated, and uses the electronic signal generated by the upstream pressure sensor 42 and the electronic signal generated by the oil temperature sensor 44 to calculate a normalised pressure drop parameter $\Delta P_O$ relating to the pressure drop over the oil filter. The pressure drop parameter $\Delta P_O$ is normalised based on the measured temperature so that the pressure drop parameter $\Delta P_O$ is independent of temperature and therefore the viscosity of the oil. A higher pressure drop corresponds to the oil filter 32 being more blocked/clogged. The oil filter condition determining module 58 therefore compares the calculated pressure drop parameter $\Delta P_O$ with a threshold pressure drop parameter. If the calculated pressure drop parameter $\Delta P_O$ has reached the threshold pressure drop parameter, then it determines that the oil filter 32 is blinded and should be changed. In response to this determination, the display 62 generates an alert, such as a visual instruction, to inform the operator that the oil filter 32 should be replaced. Over an operational cycle, the rate determining module 54 also uses the calculated oil pressure drop parameter $\Delta P_O$ to calculate a rate of change characteristic (such as a rate of change parameter) relating to the rate of change of the pressure drop over the oil filter 32. The higher the rate of change of the pressure drop parameter, the more particulate matter there is within the oil (i.e. since there is more particulate matter in the oil the filter becomes blocked more quickly). The oil quality determining module 56 therefore compares the calculated rate of change with a threshold rate of change. If the calculated rate of change has reached the threshold, then it determines that the oil is too dirty (i.e. it contains too much particulate matter) and should be changed. In response to this determination, the display 62 generates an alert, such as a visual instruction, to inform the operator that the oil should be changed. In a different embodiment, for each operational cycle an average pressure drop parameter $\Delta P_O$ is recorded. A rate of change characteristic, such as a rate of change parameter, is calculated over a plurality of operational cycles and this rate of change parameter is used to determine if the oil is too dirty.

When the valve assembly 26 is in the raising configuration (i.e. when the cylinder 14 is being extended) air flows through the air filter 34 which filters particulate matter out of the air. The upstream and downstream air pressure sensors 48, 50 generate electronic signals representative of the air pressure upstream and downstream of the filter 34 respectively. These signals are received by the pressure drop monitoring module 52. Since there is flow through the air filter 34, the pressure drop over the air filter 34 rises (i.e. the difference between the values of the two signals rises) and therefore the pressure drop monitoring module 52 determines that there is air flow through the air filter 34. In response to this determination, the electronic pressure signals generated by the air pressure sensors 48, 50 are analysed. The pressure drop monitoring module 52 is calibrated, and uses the electronics signal generated by the upstream and downstream pressure sensors 48, 50 to calculate a pressure drop parameter $\Delta P_A$ relating to the pressure drop over the air filter 34. A higher pressure drop corresponds to the air filter 34 being more blocked/clogged. The air filter condition determining module 60 therefore compares the calculated pressure drop parameter $\Delta P_A$ with a threshold pressure drop parameter. If the calculated pressure drop parameter $\Delta P_A$ has reached the threshold pressure drop parameter, then it determines that the air filter 34 is blinded and should be changed. In response to this determination, the display 62 generates an alert, such as a visual instruction, to inform the operator that the air filter 34 should be replaced.

In the embodiment described above it is determined that there is fluid flow over through the filters 32, 34 based on the signals generated by the pressure sensors. However it should be appreciated that in other embodiments other means may be used to determine if there is fluid flow through the filters. For example, operational parameters of the hydraulic actuation system could be used to determine that there is fluid flow (e.g. with the pump running and the valve assembly in the bypass configuration it could be assumed that there is oil flow through the oil filter). Alternatively, in other embodiments the oil flow and the air flow could be monitored using flow sensors to determine whether there is fluid flow through the respective filter.

It has been described that the pressure drop over the oil filter 32 is monitored using a single upstream pressure sensor, with the system calibrated appropriately. However, it should be appreciated that two pressure sensors could be used, one either side of the filter, in order to measure the pressure drop. Further, it has been described that the pressure drop over the air filter 34 is monitored using two pressure sensors; one either side of the filter 34. However, in other embodiments a single pressure sensor could be used, for example, a single pressure sensor could be located within the oil tank to measure the internal pressure.

In the above embodiment the temperature of the hydraulic fluid (i.e. the oil) is monitored using a temperature sensor 42, and that the temperature reading is used to calculate a normalized pressure drop parameter $\Delta P_O$ which is independent of temperature and viscosity. However, this feature is not essential and in other embodiments the temperature may not be monitored and the pressure drop may not be normalized or corrected for temperature.

In the embodiment described above the monitoring system 40 is always monitoring the filters and the oil quality.

However, in another arrangement a test mode could be entered into in which the filters and oil quality are assessed. For example, using a touch-screen display an operator could enter a test mode in which the system checks whether the oil filter is blinded, whether the air filter is blinded, or whether the oil is dirty. This may be done automatically by causing oil flow through the oil filter 32 for a period of time sufficient to analyse the pressure drop and the rate of change of pressure drop to assess the oil quality. The test mode may also cause air to flow through the air filter 34 for a period of time sufficient to analyse the pressure drop.

In addition to generating an alert indicating that remedial action needs to be taken (e.g. change filter, change oil), the monitoring system 40 may be capable of predicting when the oil will need to be changed, or when the filters will need to be changed. For example, the system may be able to use the rate of change of pressure drop over the oil filter to predict when the oil filter will become blinded. Further, the system may be able to monitor the rate of change of pressure over the air filter to predict when the air filter will become blinded.

The monitoring system 40 has been described as providing three functionalities: oil filter checking, air filter checking, oil quality checking. However, it should be appreciated that it could provide only one of these functionalities, or any two.

Although it has been described that the monitoring system 40 is for monitoring the hydraulic actuation system 20 of a tipper 1, it could of course be used to monitor hydraulic actuation systems 20 for actuating hydraulic cylinders of other machines.

The monitoring system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). The code may be distributed between a plurality of coupled components in communication with one another. Where appropriate, embodiments may also be implemented using code running on a field-(re) programmable analogue array or similar device in order to configure analogue hardware.

For the avoidance of doubt, the present application extends to the subject-matter described in the following numbered paragraphs (referred to as "Para" or "Paras"):

A method of generating an alert relating to a hydraulic actuation system for actuating a hydraulic cylinder, the hydraulic control system comprising a hydraulic fluid tank and a hydraulic fluid filter, the method comprising: monitoring the pressure drop over the hydraulic fluid filter; determining a rate of change characteristic relating to the rate of change of pressure drop over at least one time period in which there is a hydraulic fluid flow through the hydraulic fluid filter; determining whether the hydraulic fluid is dirty based on at least the rate of change characteristic; and generating an alert if it is determined that the hydraulic fluid is dirty.

A method according to Para 1, wherein the pressure drop is monitored using at least an upstream pressure sensor which measures the pressure upstream of the hydraulic fluid filter.

A method according to Para 1 or 2, wherein the pressure drop is monitored using at least a downstream pressure sensor which measures the pressure downstream of the hydraulic fluid filter.

A method according to Para 3, wherein the upstream pressure sensor and the downstream pressure sensor are located either side of the hydraulic fluid filter.

A method according to any preceding Para, further comprising generating a pressure drop parameter relating to the monitored pressure drop, and wherein the rate of change characteristic relates to the rate of change of the pressure drop parameter.

A method according to any preceding Para, further comprising monitoring the temperature of the hydraulic fluid, and wherein the rate of change characteristic is determined based on at least the monitored pressure drop and the monitored temperature.

A method according to any of Para 1-4, further comprising: monitoring the temperature of the hydraulic fluid; generating a pressure drop parameter relating to the monitored pressure drop; normalizing the pressure drop parameter based on the temperature of the hydraulic fluid; and determining the rate of change characteristic based on the rate of change of the normalized pressure drop parameter.

A method according to any preceding Para, further comprising determining whether there is a hydraulic fluid flow through the hydraulic fluid filter.

A method according to Para 8, wherein the pressure drop is only analysed when it is determined that there is a hydraulic fluid flow through the hydraulic fluid filter.

A method according to any preceding Para, wherein the rate of change characteristic is determined over a single time period in which there is hydraulic fluid flow through the hydraulic fluid filter.

A method according to any of Para 1-8, wherein the rate of change characteristic is determined over a plurality of time periods in which there is hydraulic fluid flow through the hydraulic fluid filter.

A method according to any preceding Para, wherein the rate of change characteristic comprises a rate of change parameter.

A method according to any preceding Para, wherein determining whether the hydraulic fluid is dirty comprises comparing the rate of change characteristic with reference data.

A method according to Para 13, wherein it is determined that the hydraulic fluid is dirty when the rate of change characteristic reaches a threshold.

A method according to any preceding Para, wherein generating an alert comprises generating a visual and/or an audible alert.

A system for generating an alert relating to a hydraulic actuation system for actuating a hydraulic cylinder, the hydraulic control system comprising a hydraulic fluid tank and a hydraulic fluid filter, the system comprising: a pressure drop monitoring module arranged to monitor the pressure drop over the hydraulic fluid filter; a rate of change determining module arranged to determine a rate of change characteristic relating to the rate of change of pressure drop over at least one time period in which there is a hydraulic fluid flow through the hydraulic fluid filter; a hydraulic fluid quality determining module arranged to determine whether the hydraulic fluid is dirty based on at least the rate of change characteristic; and an alert generator arranged to generate an alert if it is determined that the hydraulic fluid is dirty.

A system according to Para 16, further comprising an upstream pressure sensor arranged to measure the pressure upstream of the hydraulic fluid filter.

A system according to Para 17, further comprising a downstream pressure sensor arranged to measure the pressure downstream of the hydraulic fluid filter.

A system according to any of Paras 16-18, wherein the pressure drop monitoring module is arranged to generate a pressure drop parameter relating to the monitored pressure drop, and wherein the rate of change determining module is arranged to determine the rate of change characteristic based on to the rate of change of the pressure drop parameter.

A system according to any of Paras 16-18, further comprising a temperature monitoring module arranged to monitor the temperature of the hydraulic fluid; and wherein the rate of change determining module is arranged to determine the rate of change characteristic based on at least the monitored pressure drop and the monitored temperature.

A system according to any of Paras 16-18, further comprising: a temperature monitoring module arranged to monitor the temperature of the hydraulic fluid; wherein the pressure drop monitoring module is arranged to generate a pressure drop parameter relating to the monitored pressure drop and is arranged to normalize the pressure drop parameter based on the temperature of the hydraulic fluid; and wherein the rate of change determining module is arranged to determine the rate of change characteristic based on the rate of change of the normalized pressure drop parameter.

A system according to Para 20 or 21, further comprising a temperature sensor arranged to measure the temperature of the hydraulic fluid.

A system according to any of Paras 16-22, further comprising a hydraulic fluid flow determining module arranged to determine whether there is a hydraulic fluid flow through the hydraulic fluid filter.

A system according to Para 23, wherein the pressure drop monitoring module is arranged to analyse the pressure drop only when it is determined that there is a hydraulic fluid flow through the hydraulic fluid filter.

A system according to any of Paras 16-24, wherein the rate of change determining module is arranged to determine the rate of change characteristic over a single time period in which there is hydraulic fluid flow through the hydraulic fluid filter.

A system according to any of Paras 16-24, wherein the rate of change determining module is arranged to determine the rate of change characteristic over a plurality of time periods in which there is hydraulic fluid flow through the hydraulic fluid filter.

A system according to any of Paras 16-26, wherein the rate of change characteristic comprises a rate of change parameter.

A system according to any of Paras 16-27, further comprising a storage module storing reference data, and wherein the hydraulic fluid quality determining module is arranged to determine whether the hydraulic fluid is dirty by comparing the rate of change characteristic with reference data stored in the storage module.

A system according to Para 28, wherein the hydraulic fluid quality determining module is arranged to determine that the hydraulic fluid is dirty when the rate of change characteristic reaches a threshold.

A system according to any of Paras 16-29, wherein the alert generator comprises a visual and/or an audible alert generator.

A hydraulic actuation system for actuating a hydraulic cylinder, comprising: a hydraulic fluid tank; a hydraulic fluid filter; and a system in accordance with any of Paras 16-30.

A hydraulic actuation system according to Para 31, wherein the hydraulic fluid filter is provided in a wall of tank.

A method of generating an alert relating to a hydraulic actuation system for actuating a hydraulic cylinder, the hydraulic control system comprising a hydraulic fluid tank and at least one filter, the method comprising: monitoring the pressure drop over at least one filter; determining a pressure drop parameter relating to the pressure drop over at least one filter whilst there is a fluid flow through the filter; determining whether the at least one filter is blinded based on at least the pressure drop parameter; and generating an alert if it is determined that the at least one filter is blinded.

A method according to Para 33, wherein the pressure drop is monitored using at least an upstream pressure sensor which measures the pressure upstream of the filter.

A method according to Para 33 or 34, wherein the pressure drop is monitored using at least a downstream pressure sensor which measures the pressure downstream of the filter.

A method according to Para 35 when appended to Para 34, wherein the upstream pressure sensor and the downstream pressure sensor are located either side of the filter.

A method according to Para 36 or Para 35 when appended to Para 34, wherein the pressure drop parameter relates to the difference between the signals generated by the upstream pressure sensor and the downstream pressure sensor.

A method according to any of Paras 33-37, further comprising determining whether there is a fluid flow through the at least one filter.

A method according to Para 38, wherein the pressure drop is only analysed when it is determined that there is a fluid flow through the at least one filter.

A method according to any of Paras 33-39, wherein determining whether the at least one filter is blinded comprises comparing the pressure drop parameter with reference data.

A method according to Para 40, wherein it is determined that the at least one filter is blinded when the pressure drop parameter reaches a threshold.

A method according to any of Paras 33-37, wherein generating an alert comprises generating a visual and/or an audible alert.

A method according to any of Paras 33-42, wherein the pressure drop is monitored over an air filter, and an alert is generated if it is determined that the air filter is blinded.

A method according to any of Paras 33-43, wherein the pressure drop is monitored over a hydraulic fluid filter, and an alert is generated if it is determined that the hydraulic fluid filter is blinded.

A method according to Para 44, further comprising monitoring the temperature of the hydraulic fluid, and wherein the pressure drop parameter is determined based on at least the monitored pressure drop and the monitored temperature.

A method according to Para 45, wherein the pressure drop parameter is a normalized pressure drop parameter based on the temperature of the hydraulic fluid.

A system for generating an alert relating to a hydraulic actuation system for actuating a hydraulic cylinder, the hydraulic control system comprising a hydraulic fluid tank and at least one filter, the system comprising: a pressure drop monitoring module arranged to monitor the pressure drop over at least one filter and arranged to determine a pressure drop parameter relating to the pressure drop over at least one filter whilst there is a fluid flow through the filter; a filter condition determining module arranged to determine whether the at least one filter is blinded based on at least the pressure drop parameter; and an alert generator arranged to generate an alert if it is determined that the at least one filter is blinded.

A system according to Para 47, further comprising an upstream pressure sensor arranged to measure the pressure downstream of the filter.

A system according to Para 47 or 48, further comprising a downstream pressure sensor arranged to measure the pressure downstream of the filter.

A system according to Para 49, wherein the pressure drop parameter relates to the difference between the signals generated by the upstream pressure sensor and the downstream pressure sensor.

A system according to any of Paras 47-50, further comprising a flow determining module arranged to determine whether there is a fluid flow through the at least one filter.

A system according to Para 51, wherein the pressure drop monitoring module is arranged to analyse the pressure drop only when it is determined that there is a fluid flow through the at least one filter.

A system according to any of Paras 47-52, further comprising a storage module storing reference data, and wherein the filter condition determining module is arranged to determine whether the at least one filter is blinded by comparing the pressure drop parameter with reference data stored in the storage module.

A system according to Para 53, wherein the filter condition monitoring module is arranged to determine that the at least one filter is blinded when the pressure drop parameter reaches a threshold.

A system according to any of Paras 47-54, wherein the alert generator comprises a visual and/or an audible alert generator.

A system according to any of Paras 47-54, wherein the pressure drop monitoring module is arranged to monitor the pressure drop over an air filter, and wherein the alert generator is arranged to generate an alert if it is determined that the air filter is blinded.

A system according to any of Paras 47-56, the pressure drop monitoring module is arranged to monitor the pressure drop over a hydraulic fluid filter, and wherein the alert generator is arranged to generate an alert if it is determined that the hydraulic fluid filter is blinded.

A system according to Para 57, further comprising a temperature monitoring module arranged to monitoring the temperature of the hydraulic fluid, and wherein the pressure drop monitoring module is arranged to determine the pressure drop parameter based on at least the monitored pressure drop and the monitored temperature.

A system according to Para 58, wherein the pressure drop parameter is a normalized pressure drop parameter based on the temperature of the hydraulic fluid.

A hydraulic actuation system for actuating a hydraulic cylinder, comprising: a hydraulic fluid tank; a hydraulic fluid filter and/or an air filter; and a system in accordance with any of Paras 47-59.

A hydraulic actuation system according to Para 60, wherein the hydraulic fluid filter and/or the air filter is provided in a wall of tank.

A tipper comprising: a tipper body pivotably moveable with respect to a frame; a hydraulic cylinder disposed between the frame and the tipper body and actuatable to pivot the tipper body; and a hydraulic actuation system in accordance with Para 31 or 32 and/or Para 60 or 61 for actuating the hydraulic cylinder.

A tipper vehicle in accordance with Para 62.

The invention claimed is:

1. A method of generating an alert relating to a hydraulic actuation system for actuating a hydraulic cylinder, a hydraulic control system comprising a hydraulic fluid tank and a hydraulic fluid filter, the method comprising:
monitoring a pressure drop over the hydraulic fluid filter;
determining a rate of change characteristic relating to a rate of change of pressure drop over at least one time period in which there is a hydraulic fluid flow through the hydraulic fluid filter;
determining whether hydraulic fluid is dirty based on at least the rate of change characteristic; and
generating an alert if it is determined that the hydraulic fluid is dirty.

2. A method according to claim 1, wherein the pressure drop is monitored using at least an upstream pressure sensor which measures pressure upstream of the hydraulic fluid filter.

3. A method according to claim 1, further comprising generating a pressure drop parameter relating to a monitored pressure drop, and wherein the rate of change characteristic relates to the rate of change of the pressure drop parameter.

4. A method according to claim 1, further comprising monitoring a temperature of the hydraulic fluid, and wherein the rate of change characteristic is determined based on at least the monitored pressure drop and the monitored temperature.

5. A method according to claim 1, further comprising:
monitoring a temperature of the hydraulic fluid;
generating a pressure drop parameter relating to the monitored pressure drop;
normalizing the pressure drop parameter based on the temperature of the hydraulic fluid; and
determining the rate of change characteristic based on a rate of change of the normalized pressure drop parameter.

6. A method according to claim 1, wherein the rate of change characteristic is determined over a single time period in which there is hydraulic fluid flow through the hydraulic fluid filter.

7. A method according to claim 1, wherein the rate of change characteristic is determined over a plurality of time periods in which there is hydraulic fluid flow through the hydraulic fluid filter.

8. A method according to claim 1, wherein the rate of change characteristic comprises a rate of change parameter.

9. A method according to claim 1, wherein it is determined that the hydraulic fluid is dirty when the rate of change characteristic reaches a threshold.

10. A system for generating an alert relating to a hydraulic actuation system for actuating a hydraulic cylinder, a hydraulic control system comprising a hydraulic fluid tank and a hydraulic fluid filter, the system comprising:

a pressure drop monitoring module arranged to monitor a pressure drop over the hydraulic fluid filter;

a rate of change determining module arranged to determine a rate of change characteristic relating to a rate of change of pressure drop over at least one time period in which there is a hydraulic fluid flow through the hydraulic fluid filter;

a hydraulic fluid quality determining module arranged to determine whether hydraulic fluid is dirty based on at least the rate of change characteristic; and an alert generator arranged to generate an alert if it is determined that the hydraulic fluid is dirty.

11. A system according to claim 10, further comprising an upstream pressure sensor arranged to measure a pressure upstream of the hydraulic fluid filter.

12. A system according to claim 10, wherein the pressure drop monitoring module is arranged to generate a pressure drop parameter relating to the monitored pressure drop, and wherein the rate of change determining module is arranged to determine the rate of change characteristic based on the rate of change of the pressure drop parameter.

13. A system according to claim 10, further comprising a temperature monitoring module arranged to monitor temperature of the hydraulic fluid; and wherein the rate of change determining module is arranged to determine the rate of change characteristic based on at least the monitored pressure drop and the monitored temperature.

14. A system according to claim 10, further comprising:

a temperature monitoring module arranged to monitor temperature of the hydraulic fluid;

wherein the pressure drop monitoring module is arranged to generate a pressure drop parameter relating to the monitored pressure drop and is arranged to normalize the pressure drop parameter based on the temperature of the hydraulic fluid; and wherein the rate of change determining module is arranged to determine the rate of change characteristic based on the rate of change of the normalized pressure drop parameter.

15. A system according to claim 13, further comprising a temperature sensor arranged to measure temperature of the hydraulic fluid.

16. A system according to claim 10, wherein the rate of change determining module is arranged to determine the rate of change characteristic over a single time period in which there is hydraulic fluid flow through the hydraulic fluid filter.

17. A system according to claim 10, wherein the rate of change determining module is arranged to determine the rate of change characteristic over a plurality of time periods in which there is hydraulic fluid flow through the hydraulic fluid filter.

18. A system according to claim 10, wherein the hydraulic fluid quality determining module is arranged to determine whether the hydraulic fluid is dirty when the rate of change characteristic reaches a threshold.

19. A hydraulic actuation system for actuating the hydraulic cylinder, comprising:

the hydraulic fluid tank;

the hydraulic fluid filter; and a system in accordance with claim 10.

20. A tipper comprising:

a tipper body pivotably moveable with respect to a frame;

the hydraulic cylinder disposed between the frame and the tipper body and actuatable to pivot the tipper body; and the hydraulic actuation system in accordance with claim 19 for actuating the hydraulic cylinder.

* * * * *